Aug. 18, 1931.   J. H. SHERTS   1,819,444
METHOD OF MOLDING PLASTIC
Filed Feb. 27, 1928
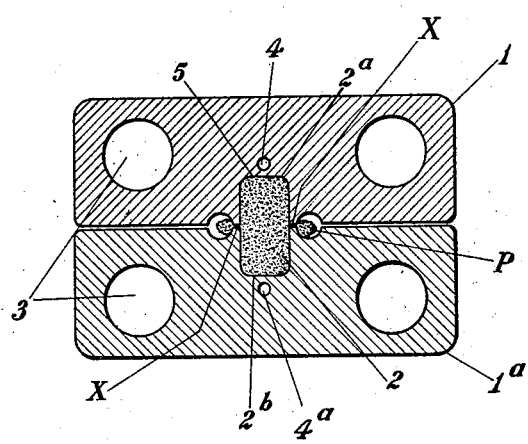
J. H. Sherts  Inventor
By his attorney Patented Aug. 18, 1931

1,819,444

UNITED STATES PATENT OFFICE

JAMES H. SHERTS, OF GLEN RIDGE, NEW JERSEY, ASSIGNOR TO DU PONT VISCOLOID COMPANY, OF WILMINGTON, DELAWARE, A CORPORATION OF DELAWARE

METHOD OF MOLDING PLASTIC

Application filed February 27, 1928. Serial No. 257,514.

This invention relates to the pressing and molding of plastics, more particularly cellulosic plastics, in the fabricating thereof. While, for the sake of definiteness, it is described with particular relation to pyroxylin plastics, it will be understood that it has application to other plastic compositions comparable to pyroxylin plastics in so far as they present similar difficulties in their fabrication. The invention has particularly to do with the elimination of so-called "heat marks" which are formed when plastics, for example cellulose nitrate and cellulose acetate plastics, are treated in the usual way in pressing and forming dies.

In the fabricating of pyroxylin plastic into various articles, for example tooth brush handles, it is the practice to introduce the plastic into the recess of a forming die and to press the plastic into desired shape while it is heated to a temperature such that the plastic will flow in the mold, and conform thereto, meaning by "flow" that the plastic softens and becomes shapable without, of course, becoming liquid; after which the mold is cooled to set the plastic in desired form. In this procedure a great difficulty has been the formation of heat marks on the flat surfaces of the article, particularly in cases where these surfaces are of considerable extent and in cases where the plastic must be heated sufficiently for the closing halves of the die to cut off the plastic. When the plastic is sufficiently warm for easy cutting, it is so warm that heat marks are liable to be formed; and when it is sufficiently cool to insure the non-formation of heat marks, it is not sufficiently warm to be cleanly cut by the dies without a liability to chipping, flaking and crushing. The heat marks, to which reference is made, are small depressions in the otherwise flat surface of the plastic and their presence greatly detracts from the appearance of the goods, sometimes sufficiently to cause their rejection. Various reasons for the formation of these heat marks have been advanced, but, without regard to what the exact reason for their formation may be, I have found that they may be obviated.

One object of the present invention is to provide a process of molding plastic compositions whereby the formation of heat marks is eliminated. A further object is to provide an apparatus wherein plastic may be molded in accordance with the indicated process. To these ends and also to improve generally upon methods and apparatus of the character indicated, my invention consists in the various matters hereinafter described and claimed.

Without restricting the invention thereto, it is described with particular reference to the mold illustrated in the accompanying drawing. In the drawing, the figure is a vertical cross section through a mold just prior to the full closing of the halves thereof, the cavity of the mold being illustrated as filled with plastic, with the excess plastic flowing out between the mold halves and being cut off by the cut-off edges of the die.

In brief, the invention comprises locally chilling the surface of the plastic being molded, I having found that this local chilling eliminates the formation of heat marks. Working in this way the plastic as a whole, and particularly at the points where the mold halves in closing cut the plastic, may be held at a sufficiently high temperature to permit proper conformity to the mold and to permit of a clean cutting of the plastic without the crushing thereof with resulting chipping and flaking; and yet the surface where heat marks would be liable to occur is reduced to a low enough temperature to prevent the formation of such marks. As an aid to the practice of the procedure as outlined, I have provided a mold such as that illustrated, somewhat conventionally, in the drawing.

As here shown, the mold comprises the upper and lower mold halves 1 and 1a of any suitable heat conducting material as cast iron or steel. Each mold half presents a half 2a or 2b of the mold cavity 2. Each mold half is provided, in the usual manner, with suitable passages as 3 for the passage of temperature controlling mediums through the mold, such as cold water and steam. But, in addition to these usual provisions 3, a mold half is provided with a passage 4 for the introduction of a suitable cooling medium, as a flow of cold water, this passage being arranged closely adjacent the surface 5 of the mold cavity which contacts the surface of the plastic which it is desired to protect against heat marks. The flow of cooling medium through such passage serves to quickly and locally cool, below the general temperature of the plastic, the surface of the plastic in close proximity to the passage 4. As will be understood by those skilled in the art, such a number of passages functioning as described may be provided as experience indicates are advisable in any particular instance. In the present case, the mold half 1a is also shown as provided with a passage as 4a.

When utilizing the present invention, the usual plastics of the arts may be used, and broadly, the usual molding procedure. That is to say, the plastic, for example a pyroxylin plastic containing (parts by weight) pyroxylin 70, camphor 28, and residual solvent, e. g. denatured alcohol, 2, may be introduced into the mold, an excess of plastic being used and steam, or superheated water, is passed through the passages 3 to heat the halves of the mold and thereby bring the plastic into such condition that it will flow in the mold and fully fill the mold cavity. The plastic is desirably heated to about 100 to 105° C. before introduction into the mold, as by heating on a hot plate or in boiling water. When the plastic has become flowable the mold is closed, the excess plastic flowing out of the mold during the closing operation, as indicated at P in the drawing. The closing of the mold shears the excess plastic from the blank at the points indicated by X X in the drawing. The temperature to which the mold should be raised for proper molding and shearing will, of course, vary somewhat with the nature of the plastic, the plasticizer used, and like factors, as will be understood by those skilled in the art. Generally speaking, and also for plastic of the composition above indicated, a die temperature of about 110 to 150° C. will be found satisfactory. The time of introducing the cold medium through the passages 4 may be somewhat varied, as circumstances and experience dictate. Generally speaking, the local cooling may be performed while the mold is yet being heated by steam in the passages 3 and just as soon as the die has completely closed, or just prior to the closing, care being taken, of course, that the chilling effect on the plastic shall not be transmitted through the plastic to interfere with the molding operation, or to the points X X where the plastic is being sheared until the shearing has been completed. In general, and also for plastic of the composition above indicated, the die should be locally cooled adjacent the points 4 and 4a to about 100° C. or less, thereby cooling the plastic stock to approximately 100° C. or less, at which temperature the plastic sets to a degree where heat marks do not develop. As will be understood by those skilled in the art, experience with different plastics, different shaped dies, and molds having different facilities for cooling and heating them, and for locally cooling them, will quickly indicate, for each specific case as it arises, the amount and time of local cooling necessary for the desired elimination of heat marks. When the mold has been closed and the plastic given sufficient time to properly distribute itself in the mold cavity, cold water is introduced into the passages 3 to chill the mold and set and harden the plastic, and after properly cooling, the mold is opened and the completed blank removed. As indicated above, the blank will be found not only properly sheared, but also without heat marks.

Returning to the die:—While the most desirable location of the cooling passage 4 will, of course, vary with particular circumstances, I may say that the passage is preferably placed as close to the adjacent wall of the mold cavity as the material of the mold will permit without danger of the mold wall caving in during the pressing; thus, with a case hardened die, the circumference of the passage may be within about one thirty-second inch of the wall, but with an ordinary steel die it is desirable to make this distance about one-sixteenth inch. As to the diameter of the passage, this, too, may vary with circumstances; with a die for tooth brush handles about four-tenths inch wide by two-tenths inch thick, a passage one-tenth inch in diameter is satisfactory, as is also one of one-fourth inch diameter. The water flow should be such as to locally cool the die to about 100° C. in a few seconds; for instance, with a one-fourth inch passage, a flow of water under a five foot head and a temperature of about 40° to 60° F. is satisfactory.

I claim:

A process for molding articles from heat-softenable plastic with the elimination of heat marks from the surface of the article as molded which method comprises: introducing a body of plastic into an article-forming mold and heating the body of plastic throughout to provide for the flowing of the body in the mold, and, during such bodily heating and the flowing of the plastic locally chilling the same only at points immediately and closely adjacent the surface of the heated body.

In testimony whereof, I affix my signature.

JAMES H. SHERTS.